United States Patent
Feng et al.

(10) Patent No.: US 10,230,647 B2
(45) Date of Patent: Mar. 12, 2019

(54) DATA PACKET PROCESSING METHOD AND DEVICE

(71) Applicant: Huawei Technologies Co., Ltd., Shenzhen (CN)

(72) Inventors: Qiang Feng, Hangzhou (CN); Huan Zhang, Hangzhou (CN); Jiang Tan, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 15/337,081

(22) Filed: Oct. 28, 2016

(65) Prior Publication Data

US 2017/0048153 A1 Feb. 16, 2017

Related U.S. Application Data

(63) Continuation of application No. PCT/CN2014/095242, filed on Dec. 29, 2014.

(30) Foreign Application Priority Data

Apr. 30, 2014 (CN) .......................... 2014 1 0182161

(51) Int. Cl.
*H04L 12/851* (2013.01)
*H04L 12/715* (2013.01)
(Continued)

(52) U.S. Cl.
CPC .......... *H04L 47/2441* (2013.01); *H04L 45/64* (2013.01); *H04L 45/38* (2013.01); *H04L 45/745* (2013.01)

(58) Field of Classification Search
CPC ... H04L 47/2241; H04L 45/64; H04L 45/745; H04L 45/38
See application file for complete search history.

(56) References Cited

U.S. PATENT DOCUMENTS

| 9,674,087 | B2* | 6/2017 | Jackson .............. H04L 45/7453 |
| 2013/0124707 | A1* | 5/2013 | Ananthapadmanabha .................. H04L 45/7457 709/223 |

(Continued)

FOREIGN PATENT DOCUMENTS

| CN | 102868645 A | 1/2013 |
| CN | 103457878 A | 12/2013 |

(Continued)

OTHER PUBLICATIONS

Machine Translation and Abstract of Chinese Publication No. CN103618679, Mar. 5, 2014, 49 pages.

(Continued)

*Primary Examiner* — Ajay Cattungal
(74) *Attorney, Agent, or Firm* — Conley Rose, P.C.

(57) ABSTRACT

A data packet processing method, Where the method includes matching a received data packet in a flow table, and determining the received data packet as a newly-established data packet, where the newly-established data packet is a data packet that needs to be reported to a controller to determine a processing manner, determining a target priority of the newly-established data packet, and reporting the newly-established data packet to the controller according to the target priority. Priorities of data packets entering an OPENFLOW switch are determined, and for unsuccessfully matched data packets, a data packet having a high priority is forwarded preferentially according to the priorities, thereby ensuring that data having a high priority is not discarded.

20 Claims, 6 Drawing Sheets (51) Int. Cl.
*H04L 12/741* (2013.01)
*H04L 12/721* (2013.01)

(56) References Cited

U.S. PATENT DOCUMENTS

| | | | | |
|---|---|---|---|---|
| 2014/0112130 A1* | 4/2014 | Yang | ............. | H04L 49/25 370/230 |
| 2014/0325038 A1* | 10/2014 | Kis | ............. | H04L 41/0803 709/220 |
| 2015/0026794 A1* | 1/2015 | Zuk | ............. | H04L 63/0227 726/13 |
| 2015/0078386 A1* | 3/2015 | Jackson | ............. | H04L 45/7453 370/392 |
| 2015/0092778 A1* | 4/2015 | Jackson | ............. | H04L 67/2842 370/392 |
| 2016/0080263 A1* | 3/2016 | Park | ............. | G06F 17/30345 370/392 |
| 2017/0237664 A1* | 8/2017 | Jackson | ............. | H04L 45/7453 370/392 |

FOREIGN PATENT DOCUMENTS

| | | | |
|---|---|---|---|
| CN | 103618679 | A | 3/2014 |
| CN | 103685009 | A | 3/2014 |
| CN | 103685310 | A | 3/2014 |
| CN | 103746892 | A | 4/2014 |
| JP | 2010021762 | A | 1/2010 |

OTHER PUBLICATIONS

Machine Translation and Abstract of Japanese Publication No. JP2010021762, Jan. 28, 2010, 24 pages.
Foreign Communication From a Counterpart Application, Chinese Application No. 201410182161.7, Chinese Office Action dated Aug. 31, 2017, 7 pages.
"OpenFlow Switch Specification," Version 1.3.4, (Protocol Version 0x04), Open Networking Foundation, Mar. 27, 2014, 171 pages.
Machine Translation and Abstract of Chinese Publication No. CN103457878, Dec. 18, 2013, 7 pages.
Machine Translation and Abstract of Chinese Publication No. CN103685310, Mar. 26, 2014, 6 pages.
Machine Translation and Abstract of Chinese Publication No. CN103746892, Apr. 23, 2014, 6 pages.
Foreign Communication From a Counterpart Application, PCT Application No. PCT/CN2014/095242, English Translation of International Search Report dated Apr. 3, 2015, 2 pages.
Foreign Communication From a Counterpart Application, PCT Application No. PCT/CN2014/095242, English Translation of Written Opinion dated Apr. 3, 2015, 6 pages.
Machine Translation and Abstract of Chinese Publication No. CN102868645, Jan. 9, 2013, 21 pages.
Foreign Communication From a Counterpart Application, Chinese Application No. 201410182161.7, Chinese Office Action dated Apr. 4, 2018, 7 pages.

\* cited by examiner

DATA PACKET PROCESSING METHOD AND DEVICE

CROSS-REFERENCE TO RELATED APPLICATIONS

This application is a continuation of International Application No. PCT/CN2014/095242, filed on Dec. 29, 2014, which claims priority to Chinese Patent Application No. 201410182161.7, filed on Apr. 30, 2014. The disclosures of the aforementioned applications are hereby incorporated by reference in their entireties.

TECHNICAL FIELD

This application relates to the field of network communications, and in particular, to a data packet processing method and device.

BACKGROUND

The OPENFLOW technology is proposed by the Standford University and is aimed at resolving, based on an existing Transmission Control Protocol (TCP)/Internet Protocol (IP) technology condition and with an innovative network interconnection concept, bottlenecks generated when a current network faces a new service. The core idea of the OPENFLOW technology is to convert a data packet forwarding process completely controlled by a switch/a router into independent processes separately completed by an OPENFLOW switch and a controller.

The OPENFLOW switch executes, in an OPENFLOW network, a command from the controller and matches a received data packet with a flow table in the OPENFLOW switch. The OPENFLOW switch forwards a successfully matched data packet to a corresponding port, and forwards an unsuccessfully matched data packet to the controller, and the controller determines a forwarding action of the data packet.

The inventor finds by researching that in a process in which the OPENFLOW switch forwards a large quantity of unsuccessfully matched data packets to the controller, when there are too many unsuccessfully matched data packets and a forwarding load exceeds a forwarding capability of the OPENFLOW switch, the OPENFLOW switch invalidates some unsuccessfully matched data packets. The invalidated data packets may include a relatively important data packet, and consequently, an important data packet is discarded.

SUMMARY

In view of this, an objective of embodiments of the present disclosure is to provide a data packet processing method and device to resolve a problem that when there are too many unsuccessfully matched data packets and a forwarding load exceeds a forwarding capability of an OPENFLOW switch, an important data packet is discarded.

According to a first aspect of the embodiments of the present disclosure, a data packet processing method is provided, including performing flow table matching on a received data packet in a flow table, and determining the received data packet as a newly-established data packet, where the newly-established data packet is a data packet that needs to be reported to a controller to determine a processing manner, determining a target priority of the newly-established data packet, and reporting the newly-established data packet to the controller according to the target priority.

With reference to the first aspect, in a first possible implementation manner, information reported to the controller includes information about the target priority of the newly-established data packet, such that the controller processes the received newly-established data packet according to the target priority.

With reference to the first aspect, in a second possible implementation manner, the determining a target priority of the newly-established data packet includes executing, if a flow entry that matches the newly-established data packet is found in the flow table, a priority update instruction in the flow entry, updating a priority of the newly-established data packet according to the priority update instruction, and determining the updated priority as the target priority of the newly-established data packet, and determining an initial priority as the target priority of the newly-established data packet if the flow entry that matches the newly-established data packet is not found in the flow table.

With reference to the second possible implementation manner of the first aspect, in a third possible implementation manner, before the performing flow table matching on a received data packet in a flow table, the method further includes setting the initial priority for the received data packet.

With reference to the second possible implementation manner of the first aspect, in a fourth possible implementation manner, if the flow table is a multi-flow table, the executing, if a flow entry that matches the newly-established data packet is found in the flow table, a priority update instruction in the flow entry, and updating a priority of the newly-established data packet according to the priority update instruction is if the flow entry that matches the newly-established data packet is found in the current flow table in the multi-flow table, executing the priority update instruction in the flow entry, and updating the priority of the newly-established data packet according to the priority update instruction, and the determining an initial priority as the target priority of the newly-established data packet if the flow entry that matches the newly-established data packet is not found in the flow table is, if the flow entry that matches the newly-established data packet is not found in the current flow table in the multi-flow table, determining whether the current flow table is a first flow table in the multi-flow table, and if the current flow table is the first flow table in the multi-flow table, using the target priority as the initial priority of the newly-established data packet, or if the current flow table is not the first flow table in the multi-flow table, using a priority, determined for the newly-established data packet in a previous flow table of the current flow table, as the target priority.

With reference to the second possible implementation manner of the first aspect, in a fifth possible implementation manner, the method further includes receiving a flow table processing command delivered by the controller, where the flow table processing command includes the priority update instruction, and establishing the flow entry in the flow table according to the flow table processing command, where an instruction set of the flow entry is the priority update instruction.

With reference to the first aspect, in a sixth possible implementation manner, the reporting the newly-established data packet to the controller according to the target priority includes encapsulating information about the newly-established data packet and the target priority that corresponds to the newly-established data packet, to obtain a data packet message, and reporting the data packet message to the controller according to the target priority.

According to a second aspect of the embodiments of the present disclosure, a data packet processing device is provided, including a matching unit configured to perform flow table matching on a received data packet in a flow table, and determine the received data packet as a newly-established data packet, where the newly-established data packet is a data packet that needs to be reported to a controller to determine a processing manner, a determining unit, connected to the matching unit configured to determine a target priority of the newly-established data packet, and a reporting unit configured to report the newly-established data packet to the controller according to the target priority.

With reference to the second aspect, in a first possible implementation manner, information reported by the reporting unit to the controller includes information about the target priority of the newly-established data packet, such that the controller processes the received newly-established data packet according to the target priority.

With reference to the second aspect, in a second possible implementation manner, the determining unit includes a first determining subunit configured to, if a flow entry that matches the newly-established data packet is found in the flow table, execute a priority update instruction in the flow entry, update a priority of the newly-established data packet according to the priority update instruction, and determine the updated priority as the target priority of the newly-established data packet, and a second determining subunit configured to, if the flow entry that matches the newly-established data packet is not found in the flow table, determine an initial priority as the target priority of the newly-established data packet.

With reference to the second possible implementation manner of the second aspect, in a third possible implementation manner, the device further includes a setting unit, connected to the matching unit configured to set the initial priority for the received data packet.

With reference to the first possible implementation manner of the second aspect, in a fourth possible implementation manner, if the flow table is a multi-flow table, the first determining subunit is configured to, if the flow entry that matches the newly-established data packet is found in the current flow table in the multi-flow table, execute the priority update instruction in the flow entry, and update the priority of the newly-established data packet according to the priority update instruction, and the second determining subunit is configured to, if the flow entry that matches the newly-established data packet is not found in the current flow table in the multi-flow table, determine whether the current flow table is a first flow table in the multi-flow table, and if the current flow table is the first flow table in the multi-flow table, use the target priority as the initial priority of the newly-established data packet, or if the current flow table is not the first flow table in the multi-flow table, use a priority, determined for the newly-established data packet in a previous flow table of the current flow table, as the target priority.

With reference to the first possible implementation manner of the second aspect, in a fifth possible implementation manner, the device further includes a receiving unit configured to receive a flow table processing command delivered by the controller, where the flow table processing command includes the priority update instruction, and an establishment unit, connected to the receiving unit configured to establish the flow entry in the flow table according to the flow table processing command, where an instruction set of the flow entry is the priority update instruction.

With reference to the second aspect, in a sixth possible implementation manner, the reporting unit includes an encapsulation subunit configured to encapsulate information about the newly-established data packet and the target priority that corresponds to the newly-established data packet, to obtain a data packet message, and a reporting subunit, connected to the encapsulation subunit configured to report the data packet message to the controller according to the target priority.

As can be seen from the technical solutions provided in the embodiments of the present disclosure, in the data packet processing method provided in the embodiments of the present disclosure, in a process of performing flow table matching on a data packet, a final target priority of a newly-established data packet is determined, and the data packet is forwarded to a controller according to the target priority. By means of the data packet processing method provided in the embodiments of the present disclosure, priorities of data packets entering an OPENFLOW switch are determined, and for unsuccessfully matched data packets, a data packet having a high priority is forwarded preferentially according to the priorities, thereby ensuring that a data packet having a high priority is not discarded.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments recorded in the present application, and persons of ordinary skill in the art may still derive other drawings from these accompanying drawings without creative efforts.

DESCRIPTION OF EMBODIMENTS

In order that persons skilled in the art better understand solutions of this application, the following clearly describes the technical solutions in the embodiments of the present application with reference to the accompanying drawings in the embodiments of the present application. The described embodiments are merely some but not all of the embodiments of the present application. All other embodiments obtained by persons of ordinary skill in the art based on the embodiments of the present application without creative efforts shall fall within the protection scope of the present application.

An embodiment of the present disclosure provides a data packet processing method, where the method is applied to an OPENFLOW switch. The OPENFLOW switch includes three parts: a flow table, a secure channel, and an OPENFLOW protocol. The flow table is used to store a forwarding rule of a data packet, the secure channel is an interface connecting the OPENFLOW switch and a controller, and the OPENFLOW protocol is used to describe a standard of information used for interaction between the controller and the switch.

The OPENFLOW switch receives a flow forwarding rule delivered by an OPENFLOW controller, and stores the flow forwarding rule in an apparatus referred to as a flow table. Each entry in the flow table is a flow rule. The flow rule includes a match field Match Field, a counter, and an instruction set. The match field is used to match a received data packet, the counter records statistics information of an entry matching a data packet, and the instruction set determines how to perform forwarding.

The match field is classified into two categories: one category is an exact match entry, that is, matching succeeds only when a data packet completely matches the match field, the other category is a wildcard match entry, that is, matching succeeds when a part of the data packet matches a corresponding part of the match field, and the other parts can be ignored in a matching process, where an ignoring rule is determined by a mask bit in the match field.

Figure 1:
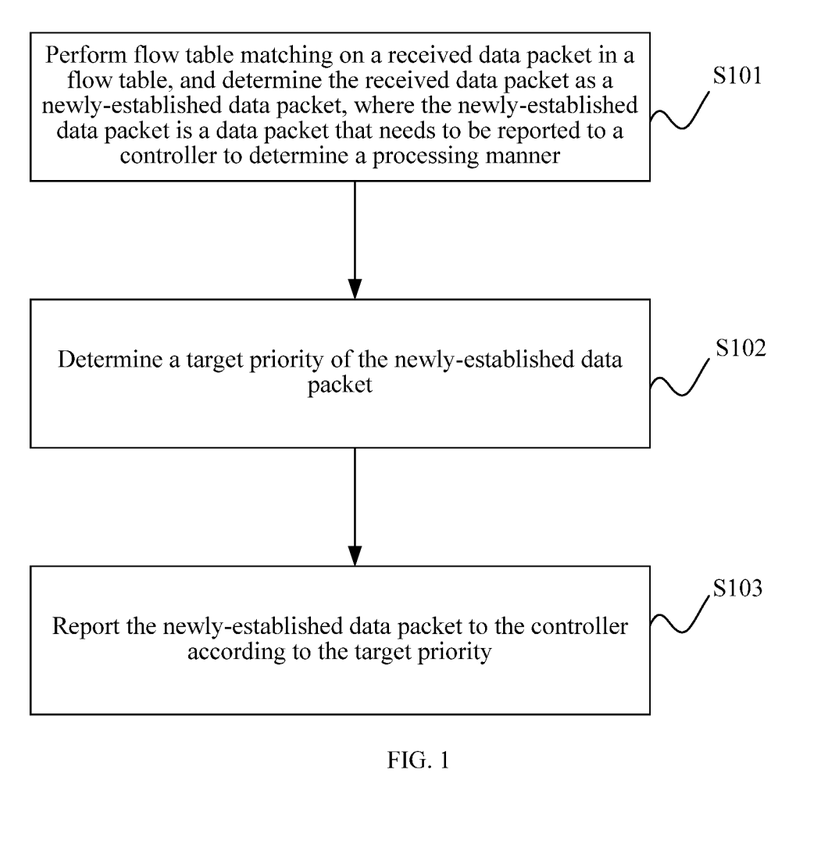
FIG. 1 is a method flowchart of a data packet processing method according to an embodiment of the present disclosure.

The data packet processing method provided in this embodiment of the present disclosure is mainly for a flow table structure in an OPENFLOW switch. The method may be executed by an OPENFLOW switch. A flowchart of the method is shown in FIG. 1, and the method includes the following steps:

Step S101: Perform flow table matching on a received data packet in a flow table, and determine the received data packet as a newly-established data packet, where the newly-established data packet is a data packet that needs to be reported to a controller to determine a processing manner.

In this embodiment of the present disclosure, the OPENFLOW switch performs flow table matching on the received data packet in the flow table, and determines the received data packet as the newly-established data packet, where the newly-established data packet is a data packet that does not match a flow entry in the flow table, or a data packet whose matching result after flow entry matching is forwarding the newly-established data packet to the controller for processing.

Step S102: Determine a target priority of the newly-established data packet.

In this embodiment of the present disclosure, before flow table matching is performed on the received data packet in the flow table, a same initial priority is set for each received data packet. In a process of performing flow table matching on the data packet, the target priority of the newly-established data packet is determined according to a matching result.

Step S103: Report the newly-established data packet to the controller according to the target priority.

In this embodiment of the present disclosure, the target priority is an updated priority of the newly-established data packet. Data packets are sorted according to target priorities. Each newly-established data packet is reported to the controller according to a target priority of the newly-established data packet.

In this embodiment of the present disclosure, information reported to the controller includes information about the target priority of the newly-established data packet, such that the controller processes the received newly-established data packet according to the target priority.

In the data packet processing method provided in this embodiment of the present disclosure, the OPENFLOW switch sets a same initial priority for each received data packet, and the OPENFLOW switch sets an initial priority value of a same data type for each data packet.

In this embodiment of the present disclosure, a data type of an initial priority value may be an enumerated type. Descriptions of an initial priority of a data packet may be preset in the OPENFLOW switch and the OPENFLOW controller. A priority of the received data packet is predefined as level 5. Priorities of data packets are divided into a highest priority, a high priority, a medium priority, a low priority, and a lowest priority. A corresponding enumerated value is set for each level of priority. In this embodiment of the present disclosure, an enumerated value of a highest priority is 4, an enumerated value of a high priority is 3, an enumerated value of a medium priority is 2, an enumerated value of a low priority is 1, and an enumerated value of a lowest priority is 0.

In this embodiment of the present disclosure, the initial priority of each received data packet is set to a medium priority, and the initial priority value of each data packet is 2.

In the data packet processing method provided in this embodiment of the present disclosure, an OPENFLOW switch sets a same initial priority value for each received data packet. On the basis of a same initial priority, data packets have different priorities after priority update. Priorities of some data packets are updated to highest priorities, priorities of some data packets are updated to low priorities, and then, unsuccessfully matched data packets are sorted according to corresponding updated priorities. A data packet having a high priority is preferentially sent to an OPENFLOW controller. In this embodiment of the present disclosure, a data packet having a high priority is an important data packet, thereby avoiding that an important data packet is discarded.

Figure 2:
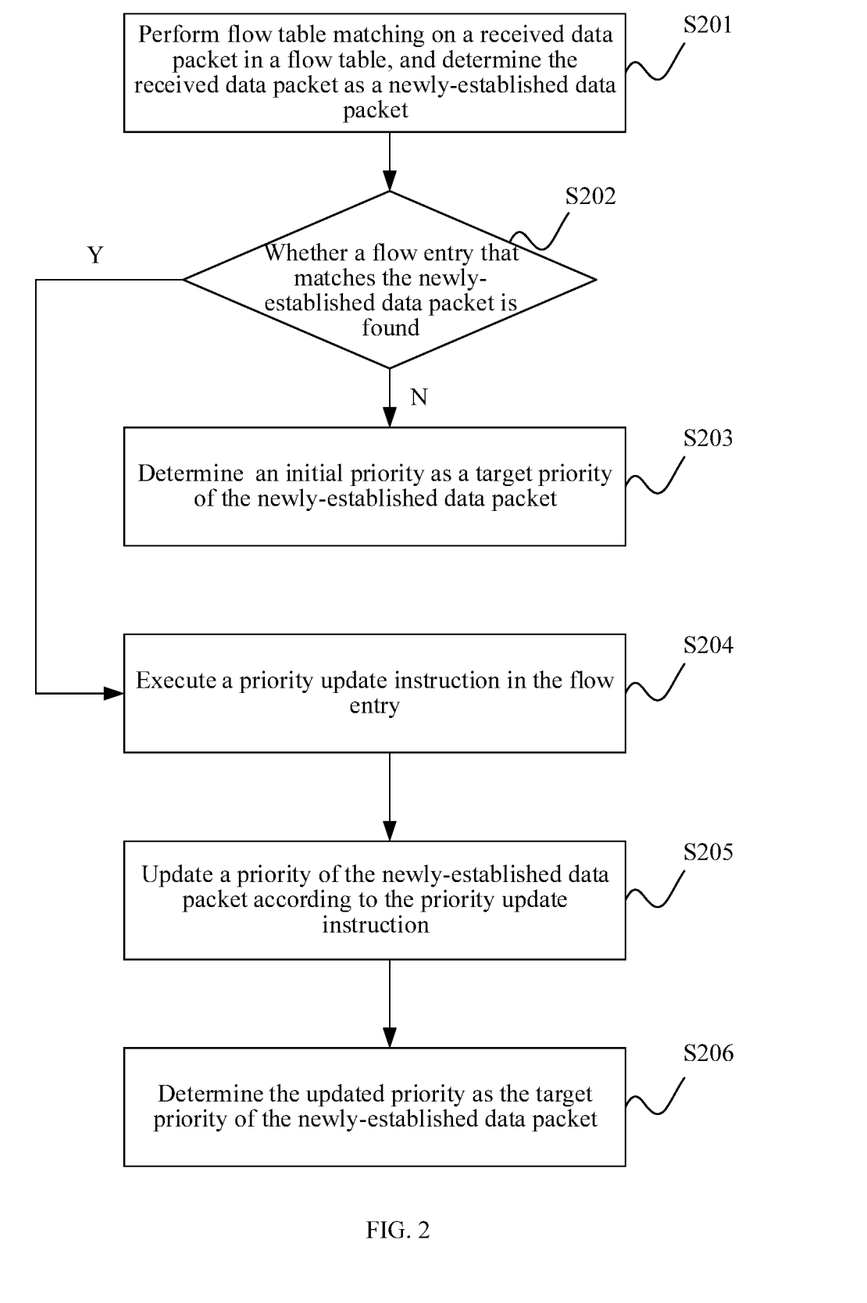
FIG. 2 is another method flowchart of a data packet processing method according to an embodiment of the present disclosure.

FIG. 2 is a flowchart of determining the target priority of the newly-established data packet in this embodiment of the present disclosure, including the following steps:

Step S201: Perform flow table matching on the received data packet in a flow table, and determine the received data packet as the newly-established data packet.

Step S202: Determine whether a flow entry that matches the newly-established data packet is found in the flow table, if the flow entry is not found, perform step S203, otherwise, perform step S204.

Step S203: Determine an initial priority as the target priority of the newly-established data packet.

In this embodiment of the present disclosure, when the data packet is received, and flow table matching is performed on the data packet in the flow table, if the flow entry that matches the newly-established data packet is not found in the flow table, the initial priority of the newly-established data packet is determined as the target priority of the newly-established data packet.

In this embodiment of the present disclosure, when receiving the data packet, an OPENFLOW switch sets a same initial priority for each received data packet.

Step S204: Execute a priority update instruction in the flow entry.

Step S205: Update a priority of the newly-established data packet according to the priority update instruction.

Step S206: Determine the updated priority as the target priority of the newly-established data packet.

The OPENFLOW protocol 1.2 and later versions define a multi-flow table structure of the OPENFLOW switch, that is, multiple flow tables exist in the switch, and respectively store flow rules of different content. For a received data packet, matching is performed from the first flow table, and serial searching is performed on subsequent flow tables according to an instruction set in an entry.

Figure 3:
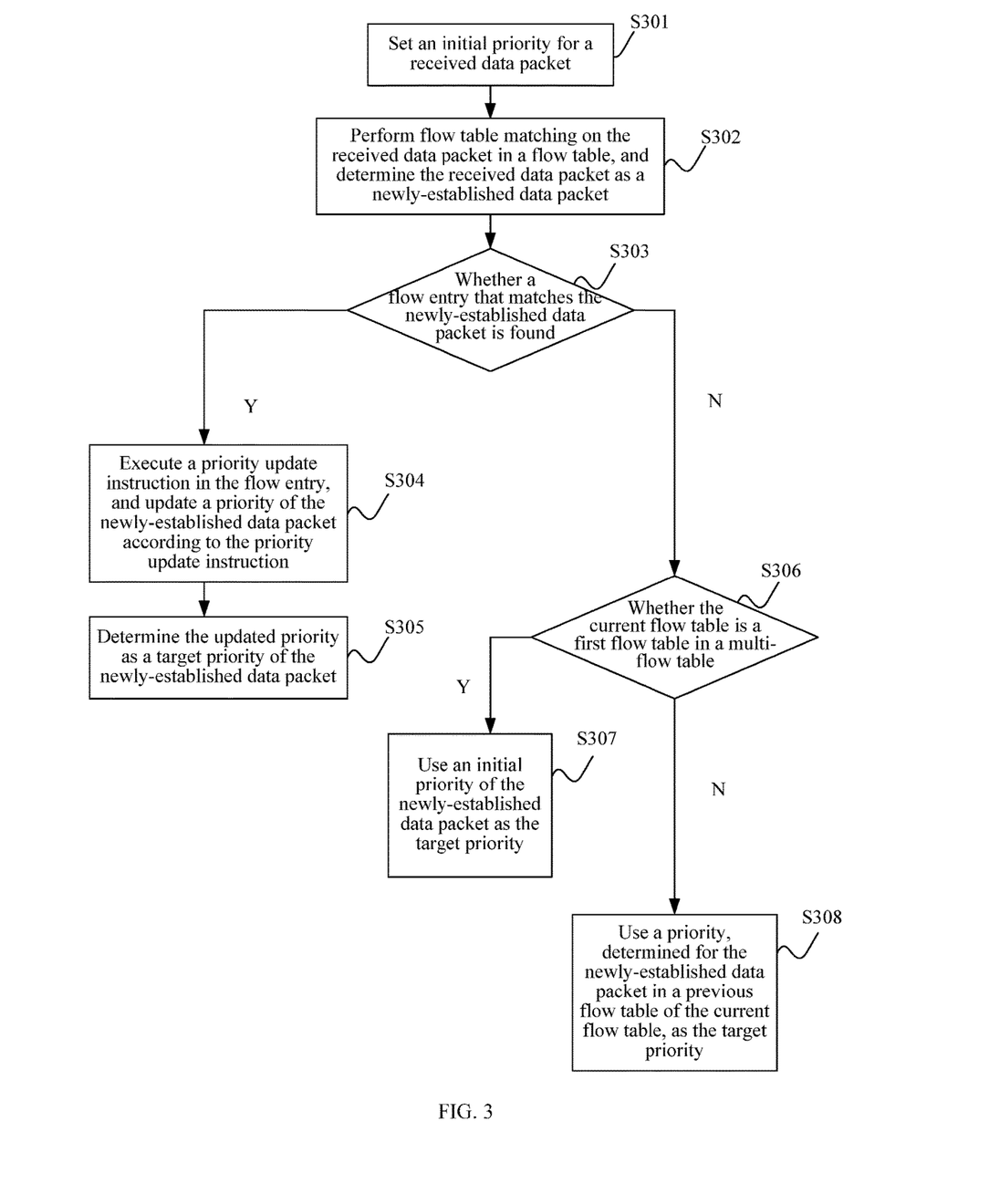
FIG. 3 is another method flowchart of a data packet processing method according to an embodiment of the present disclosure.

In this embodiment of the present disclosure, when the flow table in the OPENFLOW switch is a multi-flow table, as shown in FIG. 3 of embodiments of the present disclosure, a process of determining a target priority of a data packet includes the following steps Step S301: Set the initial priority for a received data packet.

Step S302: Perform flow table matching on the received data packet in the flow table, and determine the received data packet as the newly-established data packet.

Step S303: Determine whether a flow entry that matches the newly-established data packet is found in the flow table, if the flow entry is found, perform step S304, otherwise, perform step S306.

Step S304: Execute the priority update instruction in the flow entry, and update the priority of the newly-established data packet according to the priority update instruction.

Step S305: Determine the updated priority as the target priority of the newly-established data packet.

Step S306: Determine whether the current flow table is a first flow table in a multi-flow table, if yes, perform step S307, otherwise, perform step S308.

Step S307: Use the target priority as the initial priority of the newly-established data packet.

Step S308: Use a priority, determined for the newly-established data packet in a previous flow table of the current flow table, as the target priority.

There is a related sequence among the flow tables in the OPENFLOW switch. The OPENFLOW switch performs flow table matching on the received data packet according to the related sequence of the multi-flow table, to search for a flow entry in each flow table in the multi-flow table one by one.

Figure 4:
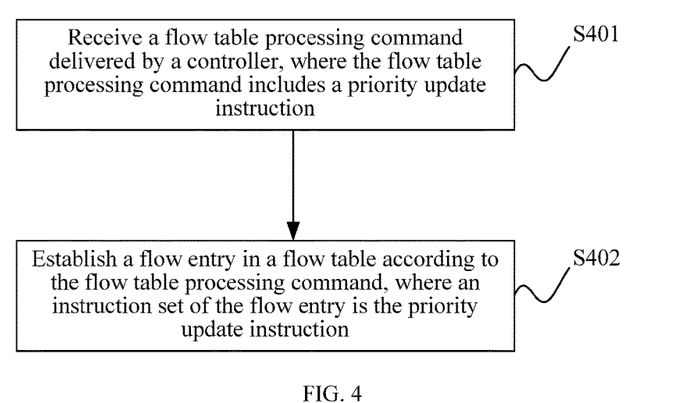
FIG. 4 is another method flowchart of a data packet processing method according to an embodiment of the present disclosure.

FIG. 4 is a flowchart of establishing the flow entry in the flow table in this embodiment of the present disclosure, including the following steps:

Step S401: Receive a flow table processing command delivered by the controller, where the flow table processing command includes the priority update instruction.

Step S402: Establish the flow entry in the flow table according to the flow table processing command, where an instruction set of the flow entry is the priority update instruction.

In the data packet processing method provided in this embodiment of the present disclosure, the data packet received by the OPENFLOW switch includes various information about the data packet. The data packet information includes a source IP address of the data packet and specific content in the data packet. The controller delivers a flow table processing command in advance to a data packet that may be received by the OPENFLOW switch, where the flow table processing command includes a priority update instruction. For example, delivery is performed according to a source IP address of the data packet. A priority of a data packet sent by an important IP address is defined as a high priority, and a corresponding priority increase instruction is delivered. A priority of a data packet sent by an ordinary IP address is defined as a low priority, and a corresponding priority decrease instruction is delivered.

The OPENFLOW switch establishes the flow entry in the flow table according to the flow table processing command delivered by the controller, where the instruction set of the flow entry is the priority update instruction.

When receiving a data packet, the OPENFLOW switch sets a same initial priority for each received data packet. The OPENFLOW switch searches for the flow entry for each data packet from a first flow table according to a sequence of the multi-flow table. When the flow entry corresponding to the data packet is found, the OPENFLOW switch executes the priority update instruction in the flow entry, to update the initial priority of the data packet, forwards the data packet to a corresponding port according to a forwarding instruction in the flow entry, or forwards the data packet to a next flow table and continues searching for the flow entry in the next flow table.

When the flow entry corresponding to the data packet is not found in a flow table, it is determined whether a currently-matched flow table is a first flow table in the multi-flow table. If yes, the initial priority of the data packet is used as a target priority of the data packet. If an initial priority value of the data packet is an enumerated value 2, the target priority of the data packet is 2.

When the currently-matched flow table is not the first flow table in the multi-flow table, a priority determined for the data packet in a previous flow table of the current flow table is used as the target priority of the data packet. If the priority determined for the data packet in the previous flow table of the current flow table is 3, when the flow entry corresponding to the data packet is not found in the current flow table, the target priority of the data packet is determined as 3.

In this embodiment of the present disclosure, an unsuccessfully matched data packet is temporarily stored in a data pool. A forwarding sequence of data packets is arranged according to target priorities corresponding to the data packets. A data packet having a high priority is preferentially reported to an OPENFLOW controller.

Figure 5:
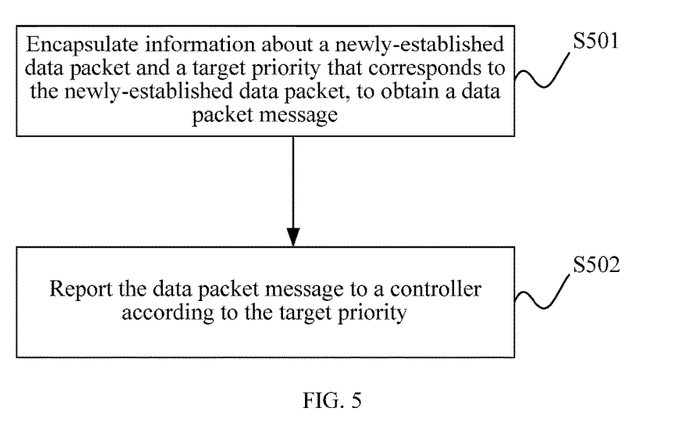
FIG. 5 is another method flowchart of a data packet processing method according to an embodiment of the present disclosure.

FIG. 5 is a flowchart of reporting the data packet in this embodiment of the present disclosure, including the following steps:

Step S501: Encapsulate information about the newly-established data packet and the target priority that corresponds to the newly-established data packet, to obtain a data packet message.

Step S502: Report the data packet message to the controller according to the target priority.

When flow table matching is performed on the newly-established data packet in a multi-flow table in an OPENFLOW switch, and a flow entry corresponding to the newly-established data packet is not found in a flow table, the OPENFLOW switch encapsulates the information about the newly-established data packet and the target priority that corresponds to the newly-established data packet to generate a packet in message, and sends the packet in message to the controller. The controller determines a forwarding port of the data packet.

In this embodiment of the present disclosure, the encapsulated information about the newly-established data packet may be all data packet information in the newly-established data packet, or may be a part of information about the newly-established data packet.

The packet in message includes data packet information such as header, buffer_id, total_len, reason, table_id, match, pad, and data, where header represents a header of the packet in message, buffer_id represents an identifier (ID) value of a data packet temporarily stored in an OPENFLOW switch, total_len represents a total length of the message, where a unit of length is byte, reason represents a source of the message reported by the OPENFLOW switch, table_id represents that a flow table, according to which the message is processed before the message is reported, in the OPENFLOW switch, match represents a series of match fields related to data packet matching, including a port through which the data packet access the OPENFLOW switch, and a source Media Access Control (MAC) address, a destination MAC address, a source IP address, a destination IP address that are of the data packet, and the like, pad represents a padding byte, and data represents specific data content in the data packet.

In this embodiment of the present disclosure, the information about the newly-established data packet and the target priority that corresponds to the newly-established data packet are encapsulated. A specific implementation manner may be adding a priority field to the sent packet in message, and sending the information about the newly-established data packet and the target priority that corresponds to the newly-established data packet to a controller together.

Corresponding to the method shown in FIG. 1, an embodiment of the present disclosure provides a data packet processing device. The data packet processing device may be an OPENFLOW switch. Mainly for a flow table structure in the OPENFLOW switch, a schematic structural diagram of the device is shown in FIG. 6, and the device includes a matching unit 601 configured to perform flow table matching on a received data packet in a flow table, and determine the received data packet as a newly-established data packet, where the newly-established data packet is a data packet that needs to be reported to a controller to determine a processing manner, a determining unit 602, connected to the matching unit configured to determine a target priority of the newly-established data packet, and a reporting unit 603 configured to report the newly-established data packet to the controller according to the target priority.

Further, information reported by reporting unit 603 to the controller includes information about the target priority of the newly-established data packet, such that the controller processes the received newly-established data packet according to the target priority.

Figure 6:
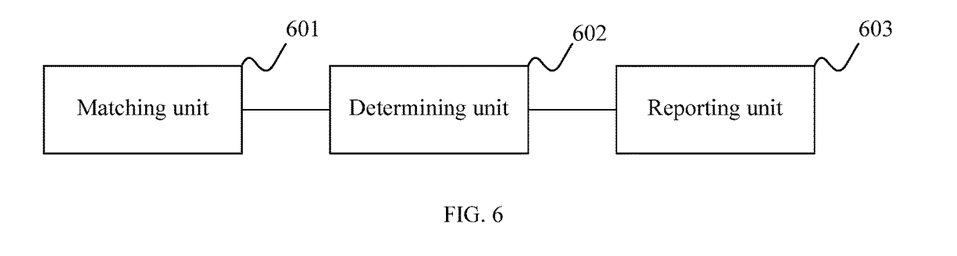
FIG. 6 is a schematic structural diagram of a data packet processing device according to an embodiment of the present disclosure.
Figure 7:
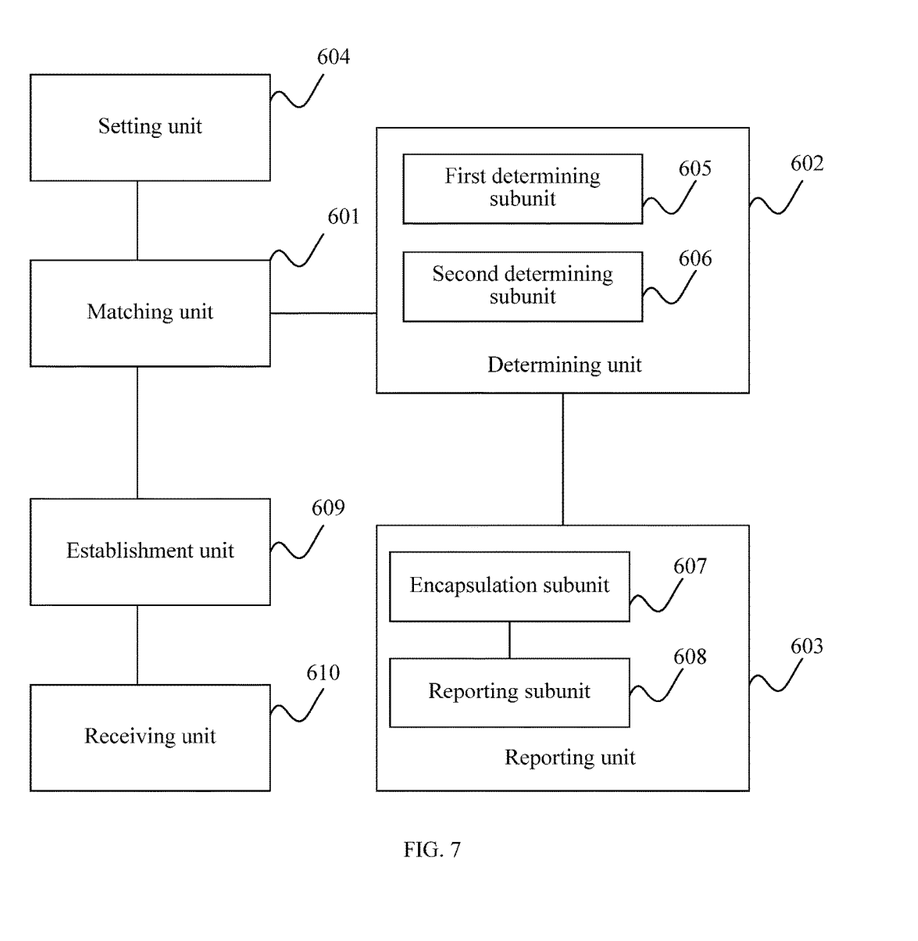
FIG. 7 is another schematic structural diagram of a data packet processing device according to an embodiment of the present disclosure.

Based on FIG. 6, this embodiment of the present disclosure provides a schematic diagram of a detailed structure of the data packet processing device. The determining unit includes a first determining subunit 605 configured to, if a flow entry that matches the newly-established data packet is found in the flow table, execute a priority update instruction in the flow entry, update a priority of the newly-established data packet according to the priority update instruction, and determine the updated priority as the target priority of the newly-established data packet, and a second determining subunit 606 configured to, if the flow entry that matches the newly-established data packet is not found in the flow table, determine an initial priority as the target priority of the newly-established data packet.

When the flow table is a multi-flow table, the first determining subunit 605 is configured to, if the flow entry that matches the newly-established data packet is found in the current flow table in the multi-flow table, execute the priority update instruction in the flow entry, and update the priority of the newly-established data packet according to the priority update instruction, and the second determining subunit 606 is configured to, if the flow entry that matches the newly-established data packet is not found in the current flow table in the multi-flow table, determine whether the current flow table is a first flow table in the multi-flow table, and if the current flow table is the first flow table in the multi-flow table, use the target priority as the initial priority of the newly-established data packet, or if the current flow table is not the first flow table in the multi-flow table, use a priority, determined for the newly-established data packet in a previous flow table of the current flow table, as the target priority.

The data packet processing device shown in FIG. 6 further includes a setting unit 604, connected to the matching unit configured to set the initial priority for the received data packet, a receiving unit 610 configured to receive a flow table processing command delivered by the controller, where the flow table processing command includes the priority update instruction, and an establishment unit 609, connected to the receiving unit configured to establish the flow entry in the flow table according to the flow table processing command, where an instruction set of the flow entry is the priority update instruction.

In the data packet processing device shown in FIG. 6, the reporting unit further includes an encapsulation subunit 607 configured to encapsulate information about the newly-established data packet and the target priority that corresponds to the newly-established data packet, to obtain a data packet message, and a reporting subunit 608, connected to the encapsulation subunit configured to report the data packet message to the controller according to the target priority.

The data packet processing device provided in this embodiment of the present disclosure is applied to an OPENFLOW switch. For a flow table structure in the OPENFLOW switch, the setting unit 604 assigns a same initial priority for each received data packet. The matching unit 601 performs flow table matching on the received data packet in a flow table, and determines the received data packet as a newly-established data packet, where the newly-established data packet is a data packet that needs to be reported to a controller to determine a processing manner. The determining unit 602 determines a target priority of the newly-established data packet. The reporting unit 603 reports the newly-established data packet to the controller according to the target priority. By means of the device provided in this embodiment of the present disclosure, priorities of data packets entering an OPENFLOW switch are determined, and for unsuccessfully matched data packets, a data packet having a high priority is forwarded preferentially according to the priorities, thereby ensuring that a data packet having a high priority is not discarded. In this embodiment of the present disclosure, a data type of an initial priority value may be an enumerated type.

In this embodiment of the present disclosure, descriptions of an initial priority of a data packet may be preset in the OPENFLOW switch and the controller. A priority of the received data packet is predefined as level 5. Priorities of data packets are divided into a highest priority, a high priority, a medium priority, a low priority, and a lowest priority. A corresponding enumerated value is set for each level of priority. In this embodiment of the present disclosure, an enumerated value of a highest priority is 4, an enumerated value of a high priority is 3, an enumerated value of a medium priority is 2, an enumerated value of a low priority is 1, and an enumerated value of a lowest priority is 0.

In this embodiment of the present disclosure, the initial priority of each received data packet is set to a medium priority, and the initial priority value of each data packet is 2.

In the data packet processing device provided in this embodiment of the present disclosure, a same initial priority value is set for each received data packet. On the basis of a same initial priority, data packets have different priorities after priority update. Priorities of some data packets are updated to highest priorities, priorities of some data packets are updated to low priorities, and then, unsuccessfully matched data packets are sorted according to corresponding updated priorities. A data packet having a high priority is preferentially sent to an OPENFLOW controller. In this embodiment of the present disclosure, a data packet having a high priority is an important data packet, thereby avoiding that an important data packet is discarded.

Figure 8:
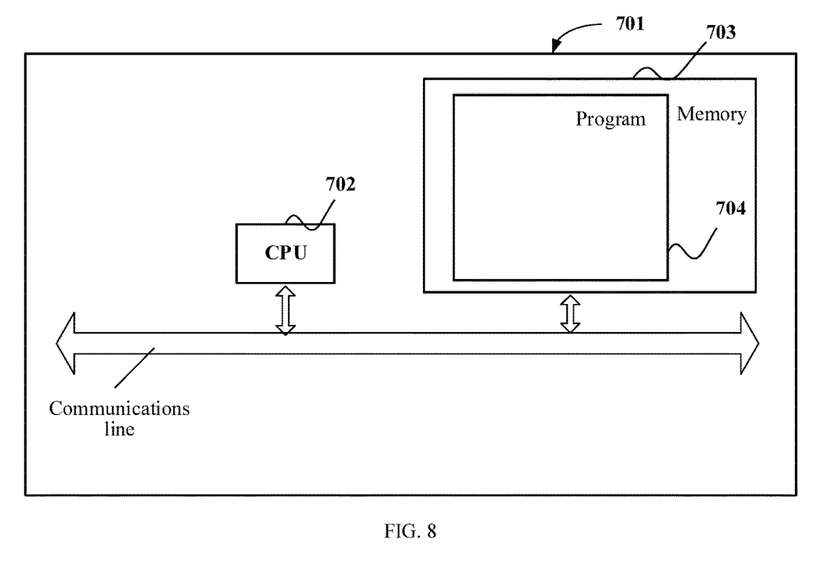
FIG. 8 is a schematic diagram of a hardware structure of a data packet processing device according to an embodiment of the present disclosure.

FIG. 8 is a schematic structural diagram of another data packet processing device according to an embodiment of the present disclosure. The device 701 may include a central processing unit (CPU) 702 and a memory 703 in hardware. By running a software program 704 stored in the memory 703 and invoking data stored in the memory 705, the CPU 702 may perform at least the following steps performing flow table matching on a received data packet in a flow table, and determining the received data packet as a newly-established data packet, where the newly-established data packet is a data packet that needs to be reported to a controller to determine a processing manner, determining a target priority of the newly-established data packet, and reporting the newly-established data packet to the controller according to the target priority.

For specific details of the foregoing steps, refer to the foregoing description in this specification. Details are not described herein again.

Similarly, the CPU 702 and the memory 703 may be integrated into a same chip or may be two independent components.

In this embodiment of the present disclosure, the program 704 may include a matching unit, a determining unit, and a reporting unit. For specific structures and functions of the matching unit, the determining unit, and the reporting unit refer to the foregoing description in this specification. Details are not described herein again.

It may be clearly understood by persons skilled in the art that, for the purpose of convenient and brief description, for a detailed working process of the foregoing device and module, reference may be made to a corresponding process in the foregoing method embodiments, and details are not described herein again.

It may be clearly understood by persons skilled in the art that, for the purpose of convenient and brief description, for a detailed working process of the foregoing device and module, reference may be made to a corresponding process in the foregoing method embodiments, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented through some communication interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. A part or all of the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data packet processing method, comprising:
matching, by a processor, a received data packet in a flow table;
determining, by the processor, that the received data packet is a newly-established data packet, wherein the newly-established data packet is a data packet that needs to be reported to a controller to determine a processing manner;
determining, by the processor, a target priority of the newly-established data packet, wherein the target priority indicates a priority at which to send the newly-established data packet to the controller and a priority at which the controller processes the newly-established data packet; and
reporting, by a transmitter coupled to the processor, the newly-established data packet to the controller according to the target priority.

2. The method according to claim 1, wherein information reported to the controller comprises information about the target priority of the newly-established data packet, wherein the controller processes the received newly-established data packet according to the target priority.

3. The method according to claim 1, wherein determining the target priority of the newly-established data packet comprises:
executing, by the processor, a priority update instruction in a flow entry to update a priority of the newly-established data packet when the flow entry that matches the newly-established data packet is found in the flow table;

determining, by the processor, the updated priority as the target priority of the newly-established data packet; and determining, by the processor, an initial priority as the target priority of the newly-established data packet when the flow entry that matches the newly-established data packet is not found in the flow table.

4. The method according to claim 3, wherein before matching the received data packet in the flow table, the method further comprises setting, by the processor, the initial priority for the received data packet.

5. The method according to claim 3, wherein the flow table is a multi-flow table, and wherein executing the priority update instruction in the flow entry to update the priority of the newly-established data packet when the flow entry that matches the newly-established data packet is found in the flow table comprises executing the priority update instruction in the flow entry to update the priority of the newly-established data packet when the flow entry that matches the newly-established data packet is found in a current flow table in the multi-flow table, wherein determining the initial priority as the target priority of the newly-established data packet when the flow entry that matches the newly-established data packet is not found in the flow table comprises:

using, by the processor, the initial priority of the newly-established data packet as the target priority when the flow entry that matches the newly-established data packet is not found in the current flow table in the multi-flow table and the current flow table is a first flow table in the multi-flow table; and using, by the processor, a priority determined for the newly-established data packet in a previous flow table of the current flow table as the target priority when the flow entry that matches the newly-established data packet is not found in the current flow table in the multi-flow table and the current flow table is not the first flow table in the multi-flow table.

6. The method according to claim 3, wherein the method further comprises:

receiving, by a receiver coupled to the processor, a flow table processing command delivered by the controller, wherein the flow table processing command comprises the priority update instruction; and establishing, by the processor, the flow entry in the flow table according to the flow table processing command, wherein an instruction set of the flow entry is the priority update instruction.

7. The method according to claim 1, wherein reporting the newly-established data packet to the controller according to the target priority comprises:

encapsulating, by the processor, information about the newly-established data packet and the target priority that corresponds to the newly-established data packet to obtain a data packet message; and reporting, by the processor, the data packet message to the controller according to the target priority.

8. A data packet processing device, comprising:
a memory configured to store a software program; and
a central processing unit (CPU) coupled to the memory and configured to run the software program to:
match a received data packet in a flow table;
determine that the received data packet is a newly-established data packet, wherein the newly-established data packet is a data packet that needs to be reported to a controller to determine a processing manner, determine a target priority of the newly-established data packet, wherein the target priority indicates a priority at which to send the newly-established data packet to the controller and a priority at which the controller processes the newly-established data packet; and report the newly-established data packet to the controller according to the target priority.

9. The device according to claim 8, wherein information reported to the controller comprises information about the target priority of the newly-established data packet, wherein the controller processes the received newly-established data packet according to the target priority.

10. The device according to claim 8, wherein the CPU is configured to:

execute a priority update instruction in a flow entry to update a priority of the newly-established data packet when the flow entry that matches the newly-established data packet is found in the flow table;

determine the updated priority as the target priority of the newly-established data packet; and determine an initial priority as the target priority of the newly-established data packet when the flow entry that matches the newly-established data packet is not found in the flow table.

11. The device according to claim 10, wherein the CPU is further configured to set the initial priority for the received data packet before matching the received data packet in the flow table.

12. The device according to claim 10, wherein the flow table is a multi-flow table, and wherein the CPU is further configured to:

execute the priority update instruction in the flow entry to update the priority of the newly-established data packet when the flow entry that matches the newly-established data packet is found in a current flow table in the multi-flow table;

use the initial priority of the newly-established data packet as the target priority when the flow entry that matches the newly-established data packet is not found in the current flow table in the multi-flow table and the current flow table is a first flow table in the multi-flow table; and use a priority determined for the newly-established data packet in a previous flow table of the current flow table as the target priority when the flow entry that matches the newly-established data packet is not found in the current flow table in the multi-flow table and the current flow table is not the first flow table in the multi-flow table.

13. The device according to claim 10, wherein the CPU is further configured to:

receive a flow table processing command delivered by the controller, wherein the flow table processing command comprises the priority update instruction; and establish the flow entry in the flow table according to the flow table processing command, wherein an instruction set of the flow entry is the priority update instruction.

14. The device according to claim 8, wherein the CPU is configured to:

encapsulate information about the newly-established data packet and the target priority that corresponds to the newly-established data packet, to obtain a data packet message; and report the data packet message to the controller according to the target priority.

15. A non-transitory medium configured to store a computer program product comprising computer executable instructions that when executed by a processor cause the processor to:
- match a received data packet in a flow table;
- determine that the received data packet is a newly-established data packet, wherein the newly-established data packet is a data packet that needs to be reported to a controller to determine a processing manner;
- determine a target priority of the newly-established data packet, wherein the target priority indicates a priority at which to send the newly-established data packet to the controller and a priority at which the controller processes the newly-established data packet; and
- report the newly-established data packet to the controller according to the target priority.

16. The non-transitory medium according to claim 15, wherein information reported to the controller comprises information about the target priority of the newly-established data packet, wherein the controller processes the received newly-established data packet according to the target priority.

17. The non-transitory medium according to claim 15, wherein the computer executable instructions that when executed by the processor further cause the processor to:
- execute a priority update instruction in a flow entry to update a priority of the newly-established data packet when the flow entry that matches the newly-established data packet is found in the flow table;
- determine the updated priority as the target priority of the newly-established data packet; and
- determine an initial priority as the target priority of the newly-established data packet when the flow entry that matches the newly-established data packet is not found in the flow table.

18. The non-transitory medium according to claim 15, wherein the computer executable instructions that when executed by the processor further cause the processor to set an initial priority for the received data packet before matching the received data packet in the flow table.

19. The non-transitory medium according to claim 15, wherein the computer executable instructions that when executed by the processor further cause the processor to:
- receive a flow table processing command delivered by the controller, wherein the flow table processing command comprises the priority update instruction; and
- establish the flow entry in the flow table according to the flow table processing command, wherein an instruction set of the flow entry is the priority update instruction.

20. The non-transitory medium according to claim 15, wherein the computer executable instructions that when executed by the processor further cause the processor to:
- encapsulate information about the newly-established data packet and the target priority that corresponds to the newly-established data packet, to obtain a data packet message; and
- report the data packet message to the controller according to the target priority.

* * * * *